US008515799B2

(12) United States Patent
Keller et al.

(10) Patent No.: US 8,515,799 B2
(45) Date of Patent: Aug. 20, 2013

(54) CONSTRUCTING CHANGE PLANS FROM COMPONENT INTERACTIONS

(75) Inventors: Alexander Keller, New York, NY (US); Wim DePauw, Scarborough, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/448,716

(22) Filed: Apr. 17, 2012

(65) Prior Publication Data
US 2013/0104133 A1  Apr. 25, 2013

Related U.S. Application Data

(62) Division of application No. 11/560,525, filed on Nov. 16, 2006, now Pat. No. 8,229,778.

(51) Int. Cl.
*G06Q 10/00* (2012.01)
(52) U.S. Cl.
USPC .......... 705/7.27; 705/7.11; 705/7.22
(58) Field of Classification Search
USPC ............... 705/7.11, 7.22
See application file for complete search history.

(56) References Cited

U.S. PATENT DOCUMENTS

| | | | |
|---|---|---|---|
| 4,706,187 A * | 11/1987 | Arai et al. ............ | 700/86 |
| 4,751,635 A | 6/1988 | Kret | |
| 5,493,682 A | 2/1996 | Tyra et al. | |
| 5,721,824 A | 2/1998 | Taylor | |
| 5,805,891 A | 9/1998 | Bizuneh et al. | |
| 5,835,777 A | 11/1998 | Staelin | |
| 5,867,714 A | 2/1999 | Todd et al. | |
| 5,960,196 A | 9/1999 | Carrier, III et al. | |
| 5,999,740 A | 12/1999 | Rowley | |
| 6,009,525 A | 12/1999 | Horstmann | |
| 6,434,568 B1 * | 8/2002 | Bowman-Amuah ............ | 1/1 |
| 7,055,130 B2 | 5/2006 | Charisius et al. | |
| 7,171,372 B2 * | 1/2007 | Daniel et al. .............. | 705/7.13 |
| 7,290,262 B2 | 10/2007 | Blizniak et al. | |
| 7,484,212 B2 * | 1/2009 | Hellerstein et al. .......... | 718/100 |
| 2001/0016063 A1 * | 8/2001 | Albeck et al. .............. | 382/154 |
| 2002/0087734 A1 | 7/2002 | Marshall et al. | |
| 2002/0129346 A1 | 9/2002 | Lee et al. | |

(Continued)

OTHER PUBLICATIONS

R. Khalaf et al., "Business Processes for Web Services: Principles and Applications," IBM Systems Journal, Jan. 2006, vol. 45, No. 2, pp. 425-446, Riverton, NJ.

(Continued)

*Primary Examiner* — William Rankins
(74) *Attorney, Agent, or Firm* — Louis J. Percello; Ryan, Mason & Lewis, LLP

(57) ABSTRACT

Techniques for constructing change plans from one or more component interactions are provided. For example, a computer-implemented technique includes observing at least one interaction between two or more components of at least one distributed computing system, consolidating the at least one interaction into at least one interaction pattern, and using the at least one interaction pattern to construct at least one change plan useable for managing the at least one distributed computing system. In another computer-implemented technique, a partial order of two or more changes is determined from at least one component interaction and is automatically transformed into at least one ordered task, wherein the at least one ordered task is linked by at least one temporal ordering constraint, and is used to generate at least one change plan useable for managing the distributed computing system, wherein the change plan is based on at least one requested change.

8 Claims, 11 Drawing Sheets

(56) References Cited

U.S. PATENT DOCUMENTS

| | | | |
|---|---|---|---|
| 2002/0138168 A1* | 9/2002 | Salonen | 700/108 |
| 2002/0147764 A1* | 10/2002 | Krupczak | 709/202 |
| 2003/0055921 A1* | 3/2003 | Kulkarni et al. | 709/220 |
| 2003/0110253 A1 | 6/2003 | Anuszczyk et al. | |
| 2004/0031015 A1 | 2/2004 | Ben-Romdhane et al. | |
| 2004/0059615 A1* | 3/2004 | Byrer et al. | 705/8 |
| 2004/0261060 A1 | 12/2004 | Haselden et al. | |
| 2005/0075748 A1* | 4/2005 | Gartland et al. | 700/108 |
| 2005/0120331 A1* | 6/2005 | Asare et al. | 717/104 |
| 2005/0159965 A1* | 7/2005 | Mann et al. | 705/1 |
| 2005/0192979 A1* | 9/2005 | Keller et al. | 707/100 |
| 2005/0193381 A1* | 9/2005 | Hellerstein et al. | 717/144 |
| 2005/0256961 A1* | 11/2005 | Alon et al. | 709/229 |
| 2005/0278700 A1 | 12/2005 | Buskens et al. | |
| 2005/0283759 A1* | 12/2005 | Peteanu et al. | 717/120 |
| 2006/0010425 A1* | 1/2006 | Willadsen et al. | 717/120 |
| 2007/0038627 A1* | 2/2007 | Cohn et al. | 707/8 |
| 2007/0174732 A1* | 7/2007 | Irby et al. | 714/47 |
| 2007/0282470 A1* | 12/2007 | Hernandez et al. | 700/90 |

OTHER PUBLICATIONS

A. Keller, "Automating the Change Management Process with Electronic Contracts," Proceedings of the 2005 Seventh IEEE International Conference on E-Commerce Technology Workshops, Jul. 2005, 9 pages, Washington, DC.

A. Keller, "The CHAMPS System: Standards-Based Autonomic Change Management with WS-BPEL, WS-Agreement and Solution Install," The Second IEEE International Conference on Autonomic Computing, Jun. 2005, 11 pages.

Y. Diao et al., "Service Level Management: A Dynamic Discovery and Optimization Approach," IEEE Transactions on Network and Service Management, Dec. 2004, vol. 1, No. 2, pp. 83-91.

A. Keller et al., "Automating the Provisioning of Applications Services with the BPEL4WS Workflow Language," IFIP/IEEE Workshop on distributed Systems; Operations & Management, Nov. 2004, 11 pages, Davis, CA.

A. Keller et al., "The Champs System: Change Management with Planning and Scheduling," IFIP/IEEE Network Operations & Management Symposium, Apr. 2004, 12 pages, Seoul, Korea.

M. El-Ramly et al., "From Run-Time Behavior to Usage Scenarios: An Interaction-Pattern Mining Approach," Proceedings of Eighth ACM SIGKDD International Conference on Knowledge Discovery and Data Mining, Jul. 2002, pp. 315-324, Alberta, Canada.

M. Apicella, "UML Simplifies Project Notation," InfoWorld, vol. 22, No. 13, p. 69, 2 pgs., San Mateo, California, Mar. 27, 2000.

M. Broy et al., "Using Extended Event Traces to Describe Communication in Software Architectures," APSEC Proceedings of the Fourth Asia-Pacific Software Engineering and International Computer Science Conference, Dec. 1997, 10 pages, Washington, DC.

* cited by examiner

CONSTRUCTING CHANGE PLANS FROM COMPONENT INTERACTIONS

CROSS-REFERENCE TO RELATED APPLICATION

This application is a divisional of U.S. patent application Ser. No. 11/560,525 filed on Nov. 16, 2006, the disclosure of which is incorporated by reference.

FIELD OF THE INVENTION

The present invention relates to distributed computing systems and, more particularly, to systems and methods for constructing change plans from one or more component interactions.

BACKGROUND OF THE INVENTION

Implementing changes for hardware, software, network and storage systems in large-scale electronic-business (e-Business) environments remains burdensome to customers. Rolling out changes, such as installing and uninstalling, upgrading or configuring systems can take weeks, partly because the complex interdependencies between applications and their supporting services are not made explicit. Therefore, human involvement and expertise is required.

Solving this change management problem automatically is advantageous in addressing the increasing complexity of computing systems. The number of relationships of a single computing resource (for example, a software component, a network component, and a storage system) range from 10 to 100. The number of computing resource instance relationships in large-scale enterprise systems is often between 1,000,000 and 1,000,000,000. Given that a change to one or more computing resources may entail additional changes on a multitude of other computing resources, it is evident that minimizing the need for human involvement in the change management process would be advantageous.

Change management is a process that offers many automation challenges. The organizational frameworks behind existing change management processes tend to be ill-defined and highly variable in detail and formality. This makes it difficult to identify tasks for automation or to reuse standardized automation across environments within or between information technology (IT) organizations (for example, this is a particular problem for corporate mergers). Additionally, effective change management requires a great deal of accurate information on technical constraints, such as dependencies between IT services, the components that implement them, and the infrastructure supporting them. This information is rarely documented formally or kept up-to-date, therefore hindering change assessment and change impact prediction.

Existing approaches involving service providers and enterprise IT departments require setting up staging areas where changes are repeatedly tested to expose their potential impacts (and adjusted accordingly) before they can be safely deployed into production environments. Building staging environments is done manually in a step-by-step fashion and is documented in textual documents termed 'build sheets' or 'run books' that are written in a natural language. Build sheets and run books are used to construct the production system, which is typically significantly larger than the staging system. This textual, human-readable representation, however, restricts the usage and execution of build sheets and run books to humans only. In particular, neither build sheets nor run books can be executed by an automated software deployment and provisioning system.

Existing approaches in the area of dependency management fall into three categories. The first category of approaches requires user input, that is, the manual entry of dependencies. An existing approach in this category is U.S. patent application Ser. No. 09/835,528 entitled "Method and Apparatus for Identifying Software Components Using Object Relationships and Object Usages in Use Cases," filed Apr. 17, 2001. This approach includes obtaining object dependency and object usages information from a user. Another existing approach in this first category is U.S. patent application Ser. No. 09/750,305 entitled "System and Method for Managing Dependencies in a Component-Based System," filed Dec. 29, 2000. This approach includes defining a resource that is part of an entity, recording a resource specifier for the resource, and recording resource dependency relationship definitions for the resource.

The second category of dependency management approaches requires access to the source code of the particular application in order to derive dependencies. An existing approach in this category is U.S. patent application Ser. No. 09/865,300 entitled "System and Method for the Manipulation of Software," filed May 24, 2001. This approach includes analyzing a body of source code and deriving a set of components from the software architecture inherent in the body of source code. Another existing approach in this second category is U.S. patent application Ser. No. 09/839,644 entitled "Methods and Systems for Identifying Dependencies Between Object-Oriented Elements," filed Apr. 20, 2001. This approach includes allowing a developer to simultaneously view a graphical and a textual display of source code.

The third category of dependency management approaches requires the presence of appropriate management instrumentation that surfaces dependency information. An existing approach in this category is U.S. patent application Ser. No. 10/055,426 entitled "Method and Apparatus for Distributed Systems Management," filed Jan. 23, 2002. This approach includes providing a first agent monitoring a first managed device. Another existing approach in this third category is U.S. patent application Ser. No. 10/021,535 entitled "Methods and Apparatus for Managing Components in an IT System," filed Dec. 21, 2001. This approach includes discovery of components carried out using fingerprints of components, which can include key elements of the component that exist in a full model of all of the elements of the component.

Existing approaches in the area of software development include U.S. Pat. No. 4,751,635, which includes a host computer extracting information from each of the support system databases to obtain data indicative of development activity for various phases of the life cycle of the software system. Another existing approach in this area is U.S. Pat. No. 5,960,196, which includes a metric collector that provides a list of available metrics related to software development, tests, and loads building for the user's selection.

Existing approaches in the area of maintenance include U.S. Pat. No. 5,493,682, which includes assembling executable systems from defined component parts such as source code files and object code files.

Existing approaches in the area of software packaging include U.S. Pat. No. 5,835,777, which includes combining listed files, the needed resources, and any related installation materials.

Existing approaches in the area of electronic software distribution of whole program packages include U.S. Pat. No. 6,009,525, which includes software products being wrapped by their publishers in a straightforward, secure manner, but in such a way as to allow for the addition of information by downstream distribution channel partners, for example, distributors and merchants (resellers). Another existing approach in this area is U.S. Pat. No. 5,721,824, which includes installation of each dominant, or primary, package and installation of the dependent, or secondary, packages dependent on that dominant package.

Existing approaches in the area of updates and/or corrections and/or fixes and/or patches include U.S. Pat. No. 5,999,740, which includes accessing a remote file server to obtain a release file containing a list of software applications available from the remote server, and comparing the release file with the registration file to determine which of the installed applications have upgrades available. Another existing approach in this area is U.S. Pat. No. 5,805,891, which includes determining whether the software maintenance module requires test, and submitting the module to test if required.

Existing approaches in the area of determining conflicts in existing software and/or hardware configurations include U.S. Pat. No. 5,867,714, which includes communications circuitry that, from time to time, automatically transmits at least part of the current hardware and software configuration data of the computer system to a remote data source capable of identifying inherent conflicts in the hardware and software configuration.

The existing change management approaches rely on detailed static or design information, source code or management instrumentation.

It would thus be desirable to overcome these and other limitations in existing change management approaches.

SUMMARY OF THE INVENTION

Principles of the present invention provide techniques for constructing change plans from one or more component interactions.

For example, in one aspect of the invention, a computer-implemented technique for constructing at least one change plan includes the following steps. At least one interaction between two or more components of at least one distributed computing system is observed. The at least one interaction is consolidated into at least one interaction pattern. The at least one interaction pattern is used to construct at least one change plan, wherein the at least one change plan is useable for managing the at least one distributed computing system.

In another aspect of the invention, a computer-implemented technique includes the following steps. A partial order of two or more changes is determined from at least one component interaction in at least one distributed computing system. The partial order of two or more changes is automatically transformed into at least one ordered task, wherein the at least one ordered task is linked by at least one temporal ordering constraint. The at least one ordered task is used to generate at least one change plan useable for managing the at least one distributed computing system, wherein the at least one change plan is based on at least one requested change.

In contrast to the above-mentioned limitations in existing approaches, principles of the invention overcome such shortcomings by, for example, being able to generate change plans even if no reliable dependency information is present.

One or more embodiments of the invention may provide one or more beneficial technical effects, such as, for example, eliminating the requirement that the distributed system provide management instrumentation. Furthermore, one or more embodiments of the invention may provide one or more beneficial technical effects, such as, for example, eliminating the need for available source code.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
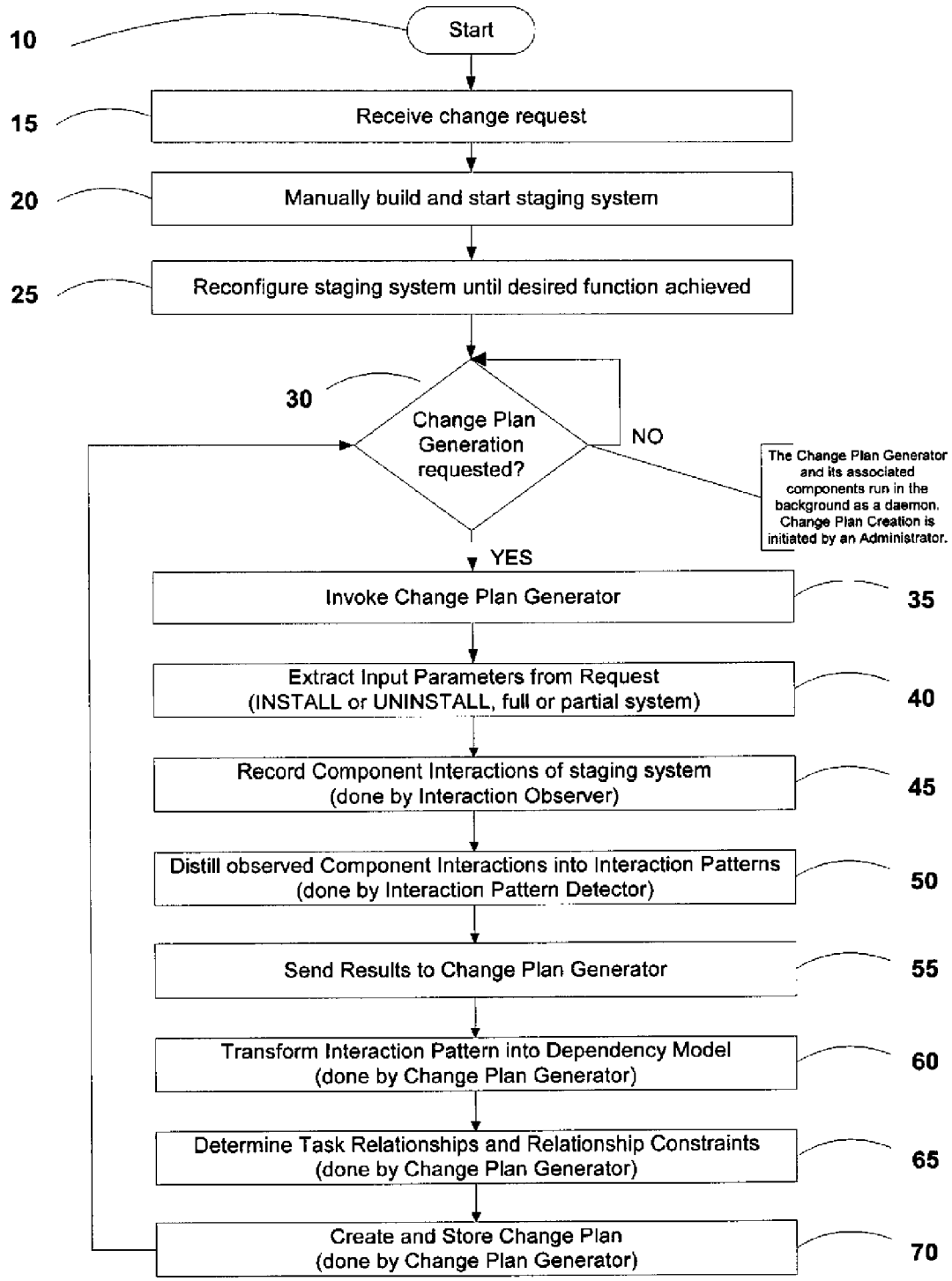
FIG. 1 is a flow diagram illustrating the control flow for constructing change plans, according to an embodiment of the present invention.

Change plans are partially ordered sets of tasks where the order in which changes are carried out will transition a computing system from a workable state into another workable state.

The identification and tracking of relationships between the components of distributed computing systems is advantageous for automated change management. For example, software components rely on a variety of supporting components. Consequently, applying a change to one component affects other components, that is, components have dependencies on other components. Dependencies exist between components on a single system and also between the components on multiple systems and organizational domains.

As used herein, "dependents" refer to components that depend on others, and "antecedents" refer to components on which other components depend.

A component often plays the role of both dependent and antecedent (for example, a component providing a name service is required by many applications and services but is depending itself on the proper functioning of other components, such as the operating system and the network protocols and infrastructure), thus leading to a dependency hierarchy that can be modeled as a directed graph.

Furthermore, dependency relationships are transitive, that is, the dependent of a given component requires, in addition to the component itself, the component's antecedent or antecedents as well. Dependencies exist between various components of a distributed system, such as, for example, end-user services, system services, applications, networking infrastructure components, and their logical and physical components.

One or more embodiments of the present invention generate dependency relationship information by observing one or more interactions among the components of a distributed system at run-time. Therefore, one or more embodiments of the present invention are able to generate change plans even if no reliable dependency information is present. Consequently, the distributed system need not provide management instrumentation, nor is there a need for the availability of source code. These features distinguish one or more embodiments of the present invention from the existing approaches in the area of change management.

In contrast to the existing approaches, one or more embodiments of the present invention generate change plans from observing and capturing the interactions occurring in a running system and subsequently condensing the interactions into interaction patterns. Furthermore, one or more embodiments of the present invention transform the captured component interactions into task sequences that are linked by temporal ordering constraints. Examples of such constraints are "Task X must finish before task Y can begin," "Task X cannot start until task Y does," "Task X cannot finish before task Y does," and "Task X cannot finish until task Y starts." Constraints apply to various types of change tasks, such as, for example, install, uninstall, configure, start, and stop.

One or more embodiments of the invention include a system that automatically captures component interactions and their subsequent automated processing into change workflows. It is to be appreciated that a workflow is the movement of tasks through a work process. Also, one or more embodiments of the invention determine the order in which changes need to be carried out to transition one or more computing systems from a workable state into another workable state. The output of one or more embodiments of the invention can be consumed and modified by, for example, planning tools, schedulers, workflow editors, workflow management engines and automated provisioning systems for data centers, or by enterprise software distribution and configuration tools. Furthermore, one or more embodiments of the present invention are able to store computed change workflows for subsequent reuse.

One having skill in the relevant art will recognize that modifications in the way dependencies are obtained, as well as the representation of dependencies, may be made without departing from the spirit and scope of the present invention. By way of example and not limitation, additional sources of dependency information may be available. With additional sources of information containing actual dependencies between components of a distributed system, the change plan generator is able to determine the steps of a change as well as the order in which they have to be carried out. As used herein, "change plan" refers to a representation of such information (that is, the steps of a change as well as the order in which they have to be carried out).

Information stored within a change plan is specific to a given combination of components, and may be decoupled from the computing systems and their characteristics (for example, computer processing unit (CPU) speed, random access memory (RAM), free and/or available disk space).

The purpose of the change plan generator disclosed herein is to construct reusable change plans for various change management operations from component interactions. As noted above, change plans describe the partial order in which tasks need to be carried out in order to transition a computing system from a workable state into another workable state. Therefore, a change plan may contain, for example, information about the change management operation that needs to be carried out (for example, install, update, configure, or uninstall). Also, a change plan may contain, for example, information about the roles and names of the components that are subject to a change, as well as the temporal and location constraints that may exist between tasks, based on component dependency information.

In one or more embodiments of the present invention a change plan may contain, in addition to the aforementioned exemplary data, information that relates to the specific hardware characteristics of a computing system (such as CPU speed, RAM or total and/or available disk space) or names and internet protocol (IP) addresses of computing systems. However, one having skill in the relevant art will recognize that modifications in the types of data contained within change plans, as well as their representation, may be made without departing from the spirit and scope of the present invention.

One or more embodiments of the present invention add architectural elements to a change management system that enable such a system to initiate a change, trigger the acquisition of dependency relationship information along with temporal constraints, identify interaction patterns, and automatically process the patterns into change plans. By way of example, one or more embodiments of the invention use component interactions to determine whether change tasks must be carried out sequentially, or whether some (or all) of the change tasks can be carried out in parallel. It should be noted that the applicability of one or more embodiments of the invention is not confined to the problem area of software provisioning and maintenance. One or more embodiments of the invention also can be used for other changes as they occur either during the configuration or reconfiguration of computing and software systems, in general-purpose project management, or changes in already-packaged software products.

Given the above realizations made in accordance with one or more embodiments of the present invention, and general features associated therewith, the remainder of the detailed description will provide an illustrative explanation of techniques for implementing such realizations and features in the context of FIGS. 1 through 11.

FIG. 1 is a flow diagram illustrating the control flow for constructing change plans, according to an embodiment of the present invention. By way of illustration, FIG. 1 depicts a scenario in which a change plan is being generated from a running system in a staging environment in order to deploy and configure a production system. One skilled in the relevant art will recognize that modifications and extensions of the staging and/or production system scenario may be made without departing from the spirit and scope of the invention. More specifically, one or more embodiments of the invention applies to any scenario where the architectural blueprint of a running distributed system needs to be constructed without prior knowledge of the system itself, and where the algorithms, steps and procedures that were applied during its construction need to be determined.

FIG. 1 includes various steps beginning with step 10. Upon receipt of a new change request in step 15, a staging system is manually built and subsequently started in step 20. In one or more embodiments of the present invention, reconfigurations are applied to the staging system to make the system achieve its desired functionality, such as, for example, setting tuning parameters to accomplish a specified system performance in step 25. In one or more embodiments of the invention, after the reconfiguring step is complete, the staging system is fully functional and running.

Figure 2:
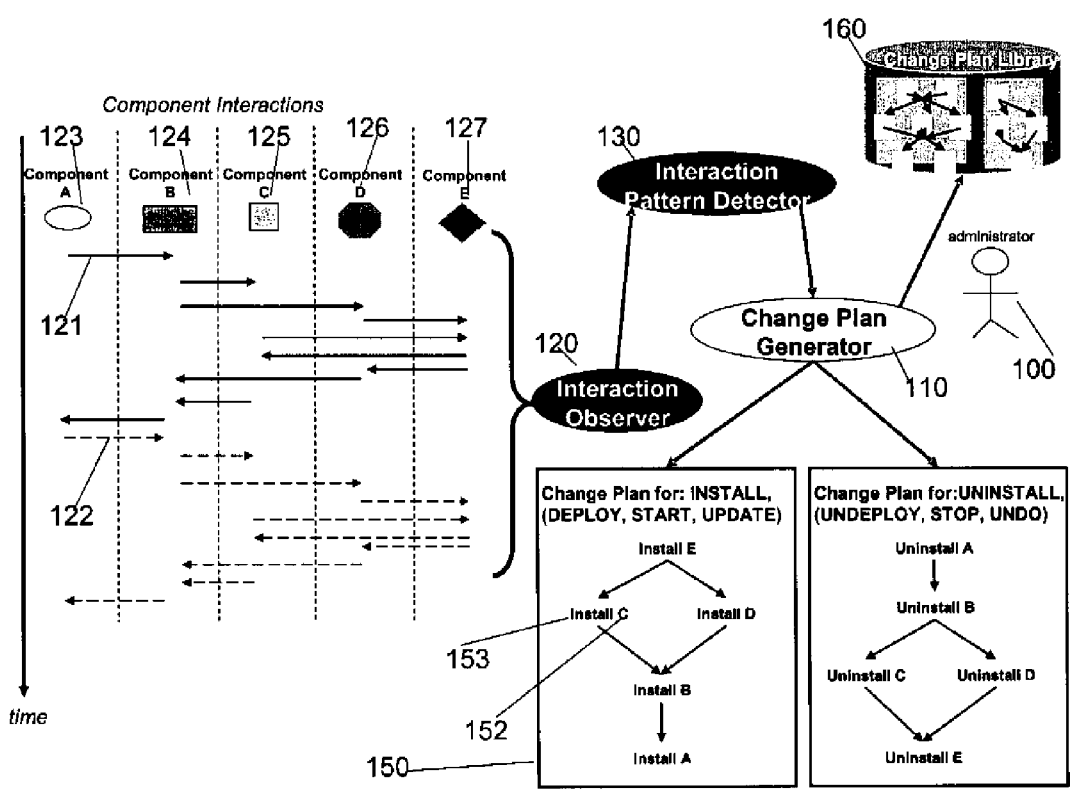
FIG. 2 is a diagram illustrating the flows between various components involved in generating change plans from component interactions, according to an embodiment of the present invention.

In a preferred embodiment, the system for generating change plans, including at least an interaction observer (120, as illustrated in FIG. 2), an interaction pattern detector (130, as illustrated in FIG. 2) and a change plan generator (110, as illustrated in FIG. 2), is implemented as a background server process (also referred to as a daemon) that is listening for incoming requests. If a request for constructing a change plan in step 30 is received from, for example, an administrator, the change plan generator 110 is invoked in step 35.

Input parameters are extracted in step 40 from the request. Examples of such parameters may include, but are not limited to, whether a change plan for the entire distributed computing system is requested, or whether the request applies only to parts of the overall system. Additional examples of input parameters may include the name of the component or components to which the change applies, the system names, and the change management operation.

The component interactions of the staging system are recorded by way of invoking the interaction observer 120, which monitors, observes and captures in step 45 all transactions that the staging system is executing. The recorded component interactions are submitted to the interaction pattern detector 130, which extracts one or more patterns from the data stream, thereby significantly reducing the volume of data and identifying the characteristic data flow structure in step 50 throughout the observed system. The identified interaction patterns are sent in step 55 to the change plan generator 110; a purpose of which may be, for example, to transform the interaction pattern or patterns into a dependency model in step 60, and determine task relationships and relationship constraints (for example, finish-to-finish (FF), finish-to-start (FS), start-to-finish (SF), and start-to-start (SS)) in step 65. Also, the change plan generator may perform task consolidation to construct the change plan in a machine-readable format, such as a general-purpose workflow language.

Additionally, the change plan may be stored in step 70 in a change plan library (160, as illustrated in FIG. 2) for subsequent reuse. Once the change plan for a given request has been generated and stored, the system may, in one or more embodiments of the invention, proceed back to step 30 to await further requests. A preferred embodiment of the invention allows the construction of change plans for both install-type scenarios (for example, change management operations such as install, deploy, start, and update) and uninstall-type scenarios (for example, change management operations such as uninstall, undeploy, stop, and undo) from the same set of interaction patterns. Also, in a preferred embodiment of the invention, the techniques may be invoked concurrently in order to service multiple requests at once.

FIG. 2 is a diagram illustrating the flows between various components involved in generating change plans from component interactions, according to an embodiment of the present invention. A preferred embodiment of the present invention constructs change plans from component interactions at run-time and may include additional architectural elements described below.

An exemplary element may include an interaction observer 120. An interaction observer is contained in the same hosting environments (for example, operating system, servlet/Enterprise JavaBeans (EJB) container) as the distributed components, and it tracks the invocation of operations on other components over time. In FIG. 2, two invocations, 121 and 122 (at different points in time, visualized by the solid 121 and dashed arrows 122), of component A 123 lead to an invocation of component B 124, which results in further interactions with component C 125, component D 126, which leads to an interaction with component E 127.

Another exemplary element may include an interaction pattern detector 130. An interaction pattern detector 130 inputs the tracking data generated by the interaction observer 120. In FIG. 2, the two invocations of component A, 121 and 122 (solid and dashed arrows), lead to further invocations with components B 124, C 125, D 126, and E 127. However, since the invocation pattern is identical, the interaction pattern detector 130 consolidates these interactions into a single interaction pattern.

Yet another exemplary element may include a change plan generator 110. A change plan generator 110 inputs the data of the interaction pattern detector 130 and constructs a change plan 150, which, may, for example, have the structure of a directed graph. The structure of an exemplary graph may follow the invocation order of the components. In a preferred embodiment, the notation in which a change plan 150 is described is a workflow language, such as, for example, the Web Services Business Process Execution Language (WS-BPEL). Also, the change plan generator 110 takes into account the different change management operations by constructing a change plan 150 either for every single change management operation and/or change management pattern. Consequently, newly constructed nodes in the graph (representing the activities) include the name of the component 152 and are tagged with the type of change management operation 153.

For purposes of completeness, one or more embodiments of the present invention may also include an administrator 100.

Also, another exemplary element may include a change plan library 160. A change plan library is a repository for storing newly constructed change plans 150 for subsequent reuse and processing.

Figure 3:
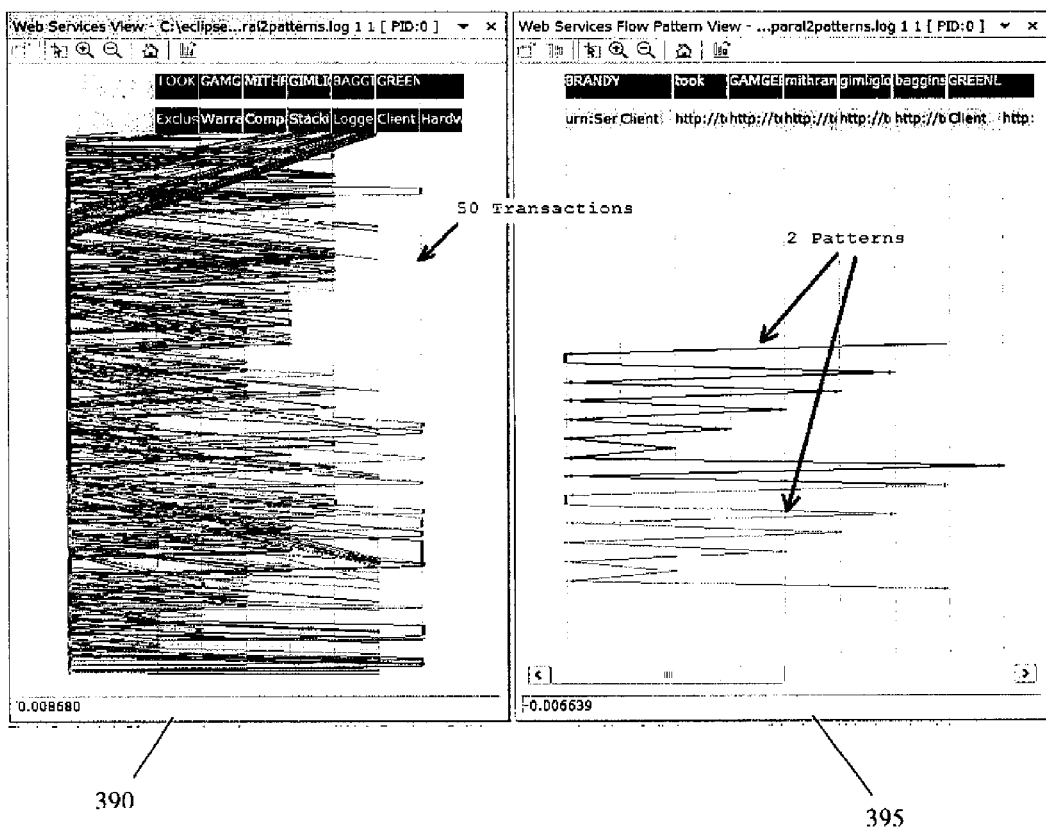
FIG. 3 is a diagram illustrating inputs and outputs of an interaction pattern detector, according to an embodiment of the present invention.

FIG. 3 is a diagram illustrating inputs and outputs of an interaction pattern detector 130, according to an embodiment of the present invention. An interaction observer 120 captures all the interactions between the components of the staging system 45. However, the amount of information that is typically recorded for realistic systems is prohibitively large for consumption by a user. This information is complex not only because of its sheer size, but also because of the large number of participating components and the concurrent character of the interactions. The left side 390 of FIG. 3 illustrates the recorded interactions of a typical system. This information is likely overwhelming to a user. To address this problem, one or more embodiments of the present invention use an interaction pattern detector 130 that extracts patterns from these many interactions.

In a preferred embodiment, a pattern extraction algorithm identifies interactions that have a causal relationship. There are many methods in the existing approaches to detect a causal relationship. In a preferred embodiment, we consider two interactions related by causality if the first interaction causes an event on a system in the same thread as a second interaction on the same system. There are other methods to establish causality, such as, for example, the propagation of an explicit correlation identifier.

As used herein, "transaction" refers to a set of all interactions related by causality. As used herein, the term transaction is used in a different way than what is sometimes defined in the context of databases or atomic actions. By way of example, a transaction may include a sequence of messages and invocations initiated by an action such as, for example, booting-up a machine. A transaction typically passes through one or more components and may branch off. Therefore, the structure of a transaction may be a tree. One or more embodiments of the invention process a set of transactions as trees and categorize them into groups or subsets.

One skilled in the relevant art will appreciate that it is possible to use similar algorithms to extract patterns from a large amount of interactions recorded by the interaction observer 120. An exemplary result of a pattern extraction is illustrated on the right side 395 of FIG. 3.

Figure 4:
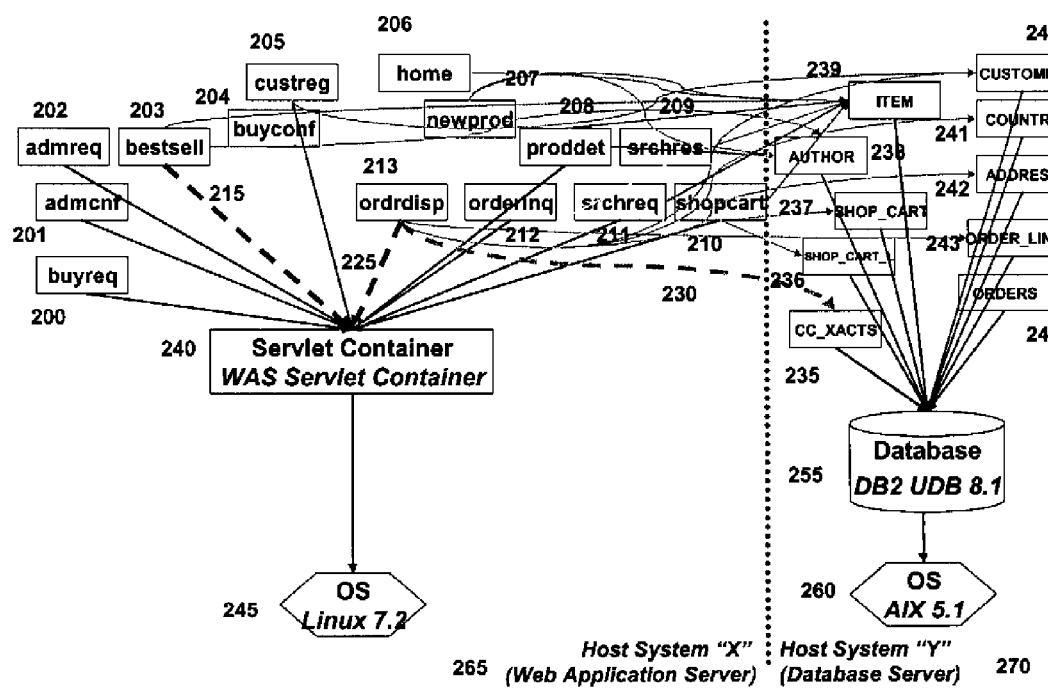
FIG. 4 is a diagram illustrating the generated topology as well as the dependency relationships of an electronic-commerce (e-Commerce) application system, according to an embodiment of the present invention.

FIG. 4 is diagram illustrating the generated topology as well as the dependency relationships of an electronic-commerce (e-Commerce) application system, according to an embodiment of the present invention. Such a relationship model focuses on software components and their logical (for example, modules and components) and physical (for example, files and shared libraries) architecture. The relationship model illustrated in FIG. 4 has been obtained by running the observed interactions through the interaction pattern detector 130. Subsequently, the change plan generator 110 will build the dependency graph from the identified interaction pattern.

By way of example, FIG. 4 depicts that computing system "X" 265 plays the role of a web application server and hosts a number of components described below. The electronic-enterprise (e-enterprise) application, which may, for example, be implemented by a total of 14 servlets. Servlets may include, for example, BuyRequest (buyreq) 200, AdministratorConfiguration (admcnf) 201, AdministratorRequest (admreq) 202, BestSellers (bestsell) (203), BuyConfirmation (buyconf) 204, CustomerRegistration (custreg) 205, home 206, NewProducts (newprod) 207, ProductDetails (proddet) 208, SearchResults (srchres) 209, ShoppingCart (shopcart) 210, SearchRequest (srchreq) 211, OrderInquiry (ordering) 212 and OrderDisplay (ordrdisp) 213. As illustrated in the example of FIG. 4, each servlet corresponds to a possible transaction on a website. For example, the specific example website used in FIG. 4 is a bookseller's web storefront, but one or more embodiments of the present invention could be used with any other (web) application. By way of example, some of the servlets may encapsulate the business logic of the application.

The servlet container 240 may be implemented, for example, by IBM WebSphere Application Server (WAS) servlet container. The operating system (OS) 245 may be, for example, Linux version 7.2.

Computing system "Y" 270 plays the role of a database server and can host a variety of components, as described below. In one embodiment of the present invention, the components may include 10 database tables. Database tables may include, for example, credit card transaction table (cc_xacts) 235, ShoppingCartLineItem (shop_cart_L) 236, ShoppingCart (shop_cart) 237, author 238, item 239, customer 240, country 241, address 242, OrderLineItem (order line) 243 and orders 244. Database tables may, for example, hold the data accessed by the servlets.

In one or more embodiments of the present invention, the database tables reside within a database 255 implemented, for example, by (IBM) DB2 Universal Database (UDB) version 8.1, and also within an operating system (OS) 260, such as, for example, (IBM) Advanced Interactive Executive (AIX) version 5.1.

A request may be submitted, for example, by an administrator 100 to the change plan generator 110 specifying that two servlets, BestSellers (bestsell) 203 and OrderDisplay (ordrdisp) 213 need to be installed on host system "X" 265. This is one example of building a change plan for a partial system as only a subset of the overall distributed system considered for the construction of the change plan.

In one or more embodiments of the invention, it may be assumed that the operating system 245 is already present on host system "X" 265. In addition, it may be assumed that operating system 260 is already present on host system "Y" 270. Also, in one or more embodiments of the invention, it is assumed that the change management system is subject to an operational policy stating that a servlet container must be installed on a different system than a database.

The invocation of the change plan generator 110 for a request yields one or more dependencies. By way of example, various dependencies are depicted in FIG. 4 by dashed lines. For example, as illustrated in FIG. 4, the bestsell servlet 203 depends only on the servlet container 240 on host system "X" 265. This dependency is illustrated by the arrow labeled 215. The ordrdisp servlet 213, in contrast, depends on both the servlet container 240 on host system "X" 265 as well as on the credit card transaction table (CC_XACTS) 235 on host system "Y" 270. The former dependency is illustrated by the arrow labeled 225, and the latter dependency is illustrated by the arrow labeled 230. Consequently, in the exemplary depiction of FIG. 4, it would be advantageous to determine the allowable partial order in which the following components can be installed on two or more systems: bestsell servlet 203, ordrdisp servlet 213, servlet container 240, CC_XACTS table 235 and database 255.

Figure 5:
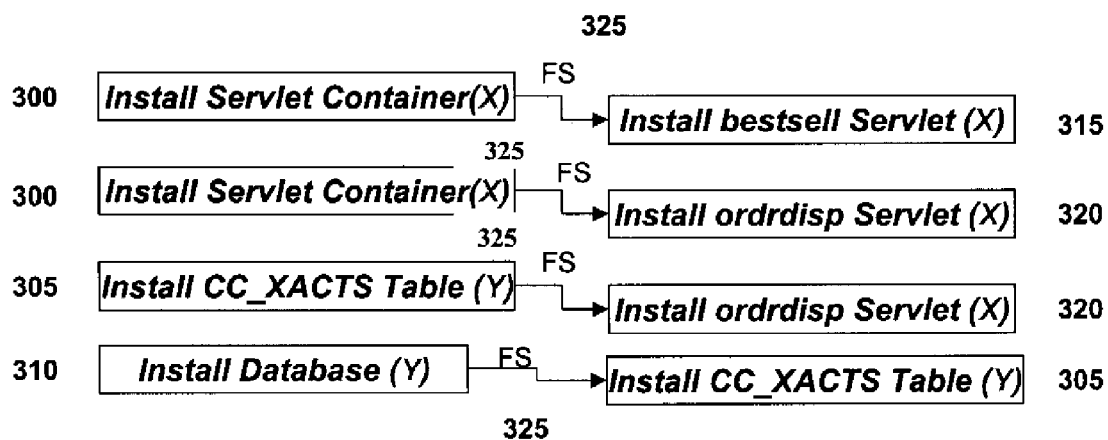
FIG. 5 is a diagram illustrating task relationships and relationship constraints, according to an embodiment of the present invention.

We now turn to FIG. 5, which is a diagram illustrating task relationships and relationship constraints, according to an embodiment of the present invention. In one or more embodiments of the invention, a dependency model is needed in a granularity that specifies the one or more components required by each individual component. As such information is often not directly available; the change plan generator 110 generates this information as described below. The change plan generator 110 invokes the interaction observer 120 as well as the interaction pattern detector 130. The change plan generator 110 also transforms the obtained interaction pattern into a dependency graph to determine whether tasks implied by a change must be carried out sequentially, or whether some of the tasks can be carried out concurrently.

Different change management operations require different traversals through the dependency model. By way of example and not limitation, a request for a new installation of a component leads the change plan generator 110 to determine which components must already be present before a new component can be installed. On the other hand, for example, a request for an update, or a request for an uninstall of a component will result in determining the components that will either be impacted by the change or which need to be removed first to preserve the integrity of the system.

By way of another example, if an installation change management operation needs to be carried out, the consideration of the results of the relationship traversal (carried out by the change plan generator 110) yields that the tasks described below are subject to relationship constraints.

The "Install servlet container on host system 'X'" task 300 must be finished ("FS" type relationship constraint 325) before the "Install bestsell servlet on host system 'X'" task 315 can be started.

The "Install servlet container on host system 'X'" task 300 must be finished ("FS" type relationship constraint 325) before the "Install ordrdisp servlet on host system 'X'" task 320 can be started.

The "Install CC_XACTS table on host system 'Y'" task 305 must be finished ("FS" type relationship constraint 325) before the "Install ordrdisp servlet on host system 'X'" task 320) can be started.

The "Install database on host system 'Y'" task 310 must be finished ("FS" type relationship constraint 325) before the "Install CC_XACTS table on host system 'Y'" task 305 can be started.

With this information, the change plan generator 110 can proceed with consolidating the tasks in order to construct the change plan.

Figure 6:
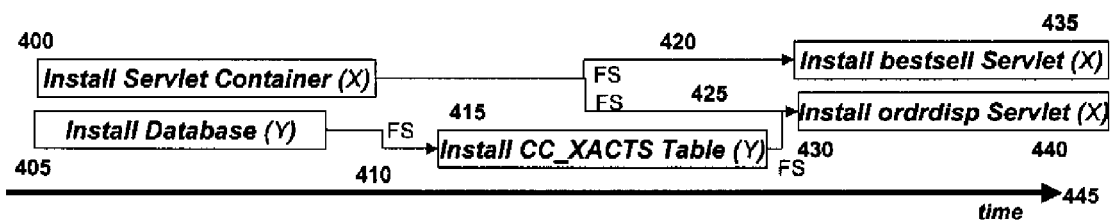
FIG. 6 is a diagram illustrating a constructed change plan, according to an embodiment of the present invention.

FIG. 6 is a diagram illustrating a constructed change plan, according to an embodiment of the present invention. An exemplary illustration, such as FIG. 6, may depict a change plan for installing the bestsell and ordrdisp servlets of an e-Commerce application, according to an embodiment of the present invention. The existence of a dependency between two components indicates that a relationship (for example, FS, SS, FF, and/or SF) constraint or a location constraint (for example, a policy forbidding collocation of database and servlet container) exists between the dependent and the antecedent. In one or more embodiments of the present invention, the change plan generator observes various rules as described below.

Any task may have zero or more incoming and outgoing links.

If, within a set of task relationships, a task is the predecessor of several other different tasks, one instance of this task is chosen and for every succeeding task an outgoing link is attached to this task.

If, within a set of task relationships, a task is succeeding several other different tasks, one instance of this task is chosen and for every preceding task an incoming link is attached to this task.

If a relationship constraint exists between two tasks, the two tasks need to be carried out within a sequence.

If two tasks share the same predecessor and no temporal constraints exist between them, the two tasks can be executed concurrently.

The container for grouping tasks and their constraints on a per-host basis is a sequence.

The outermost container for grouping per-host sequences is a process.

By following the above rules, a change plan generator, in one or more embodiments of the invention, is able to consolidate the task relationships depicted in FIG. 5 into an exemplary change plan, as described below, including two sequences that are grouped on a per-host basis and aggregated into a process.

The "Host X sequence" includes the following tasks and links: The "Install servlet container on host system "X"" task 400 has two outgoing FS-type links 420 and 425 pointing to the "Install bestsell servlet on host system "X"" task 435 and "Install ordrdisp servlet on host system "X"" task 440, respectively.

The "Host Y sequence" includes the following tasks and links: The "Install database on host system 'Y'" task 405 has one outgoing FS-type link 410 pointing to the "Install CC_XACTS table on host system 'Y'" task 415.

Finally, one link 430 crosses the two per-host sequences because the "Install CC_XACTS table on host system 'Y'" task 415 must be finished (FS-type relationship constraint) 430 before the "Install ordrdisp servlet on host system 'X'" task 440 can be started.

The time axis 445 is used to illustrate the order in which these tasks need to be carried out.

Figure 7:
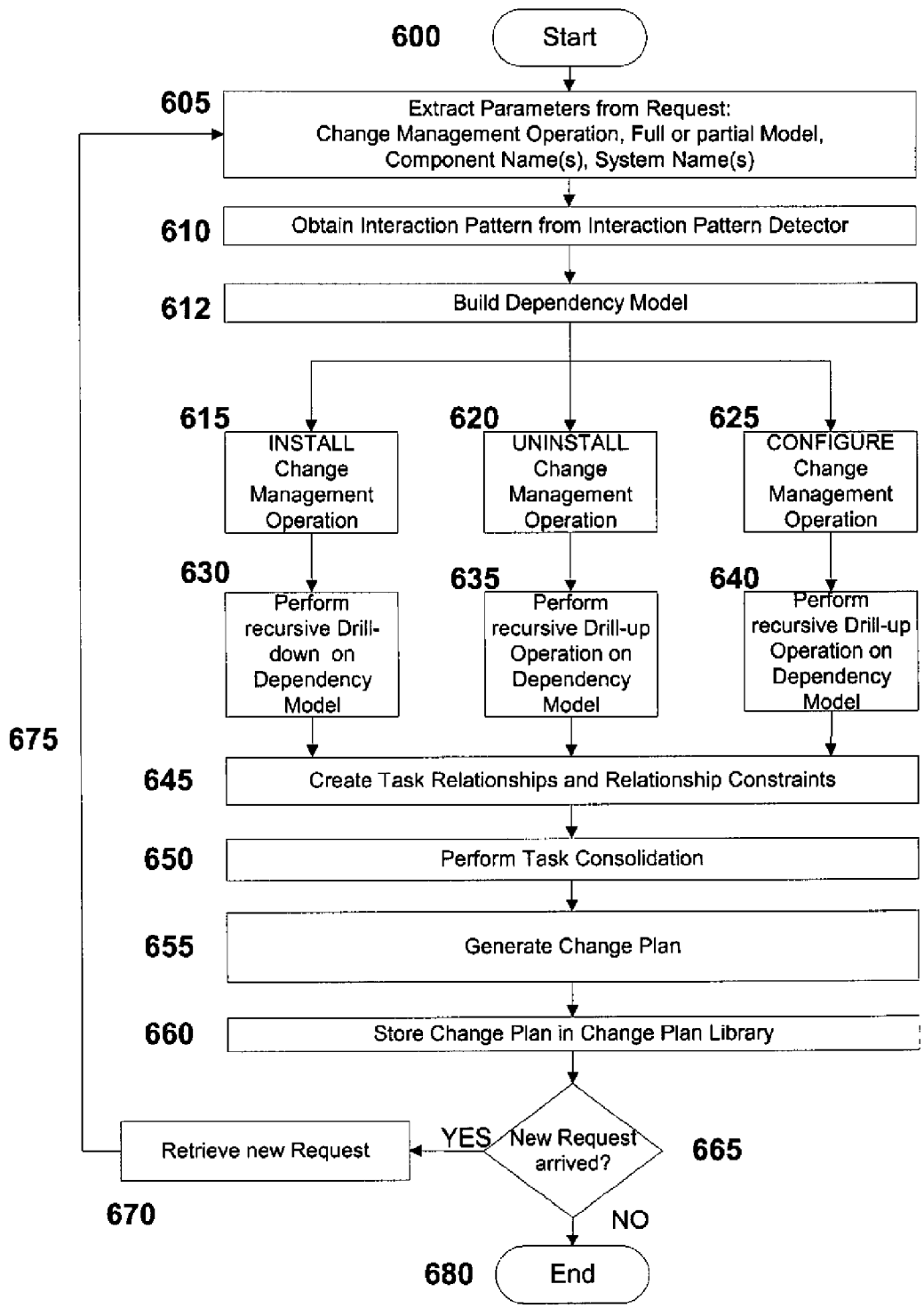
FIG. 7 is a flow diagram illustrating steps for determining the order of changes, according to an embodiment of the present invention.

We now turn to FIG. 7, which is a flow diagram illustrating steps for determining the partial order of changes and task durations, according to an embodiment of the present invention. In one or more embodiments of the invention, the algorithm begins at step 600 and includes additional steps as described below. Upon receipt of a new request, the change plan generator extracts the relevant parameters from the request in step 605. Examples of a parameter may include whether the construction of a change plan for the entire distributed computing system is requested, or whether the request applies only to parts of the overall system. Additional exemplary parameters may include the name of the component or components that need to be changed, the computing system names, and the change management operation.

The interaction pattern is obtained in step 610 from the interaction pattern detector and transformed in step 612 into a dependency model. Different procedures are applied according to the type of change management operation specified in the request submitted by the administrator. For example, a request may specify an install change management operation in step 615, an uninstall change management operation in step 620, or a configure change management operation in step 625. One skilled in the relevant art will recognize that modifications and extensions of the change management operations may be made without departing from the spirit and scope of the invention.

In the example of a request specifying an install change management operation in step 615, the change plan generator would perform a recursive drill-down operation in step 630 on the dependency model. A list of components to be installed would be returned as well.

In the example of a request may specify an uninstall change management operation in step 620, the change plan generator would perform a recursive drill-up operation in step 635 on the dependency model to retrieve a list of components that would be impacted by the update change management operation.

In the example of a request may specify a configure change management operation in step 625, the change plan generator would perform a recursive drill-up operation in step 640 on the dependency model to retrieve a list of components that would be impacted by the configure change management operation.

In the examples described above, the change plan generator would also create the task relationships as well as the relationship constraints in step 645 from the data contained in the dependency model. The change plan generator also performs the task consolidation step 650 to generate a change plan in step 655. The change plan is stored in the change plan library in step 660 and returned to the administrator for further processing.

Also, the change plan generator may verify whether one or more new requests for change (RFCs) have arrived for which the procedure needs to be repeated in step 665. If a new request has arrived, one or more embodiments of the invention will retrieve a new request in step 670 and transition in step 675 to step 605. If a new request has not arrived, one or more embodiments of the present invention will end at step 680.

Figure 8:
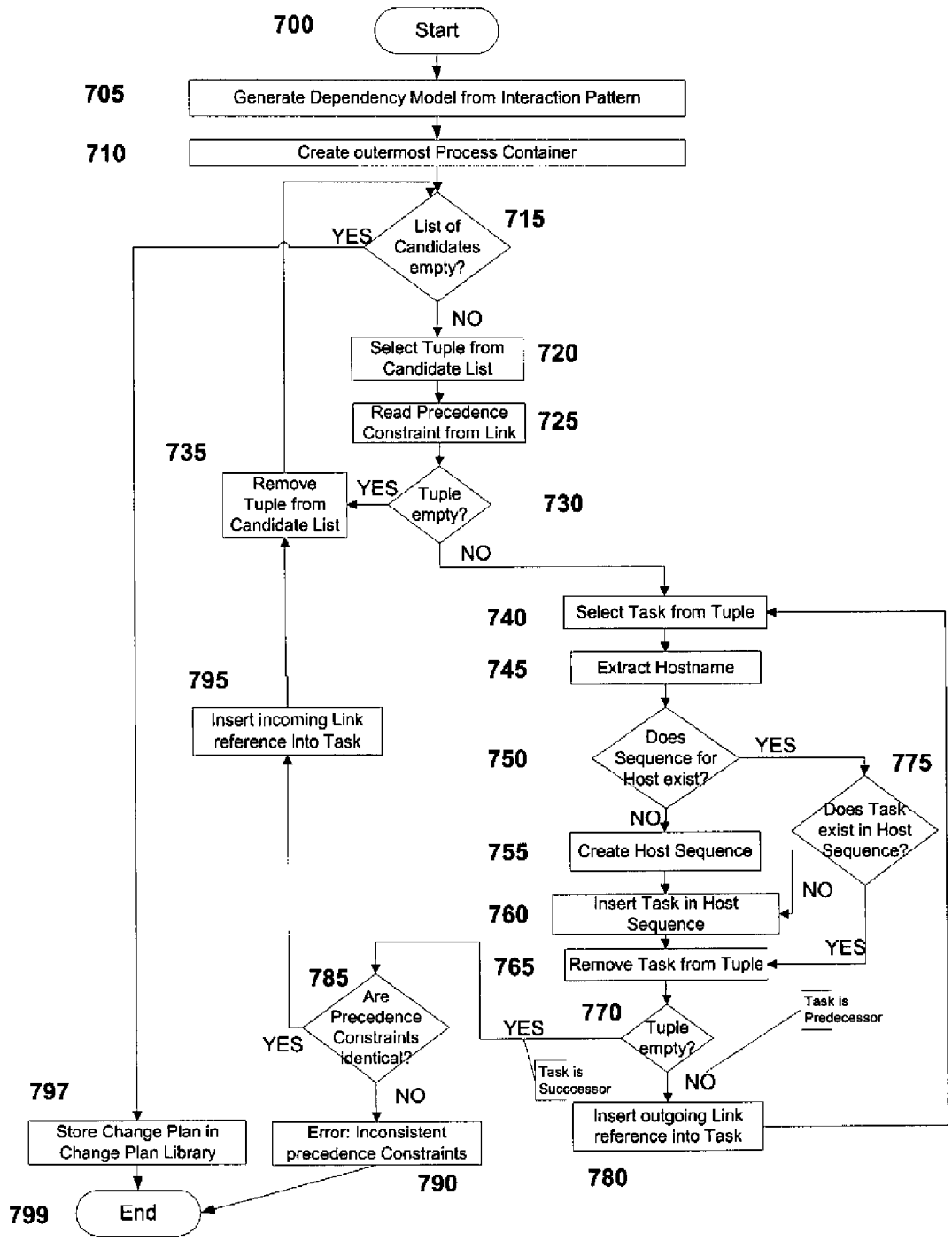
FIG. 8 is a flow diagram illustrating steps for constructing a change plan from component interactions, according to an embodiment of the present invention.

FIG. 8 is a flow diagram illustrating steps for constructing a change plan from component interactions, according to an embodiment of the present invention. In one or more embodiments of the invention, the algorithm begins at step 700 and includes various additional steps as described below. An interaction pattern is obtained from the interaction pattern detector and is transformed into a dependency model in step 705. The outermost element of a workflow (for example, a process container) is created in step 710 in which all other elements of a change plan will be subsequently inserted.

In one or more embodiments of the present invention, the dependency model contains a list of component tuples. The overall list of tuples is referred to herein as a candidate list. In one or more embodiments of the invention, it is assumed that every tuple contains first the antecedent, and then the dependent component, each prefixed with the name of the change management operation the administrator has specified in the request. Every element of a tuple can then be referred to as a task. In one or more embodiments of the present invention, the first element of a tuple is the predecessor task, and the second element is the successor. An example of a task is "Install servlet container on host 'X'".

Also, every tuple stores a precedence constraint (such as, for example, FS, SS, SF, and/or FF) that annotates the dependency link. One skilled in the relevant art will recognize that modifications and extensions to the way the dependency graph is represented may be made without departing from the spirit and scope of the invention.

As illustrated in FIG. 8, one or more embodiments of the invention determine if the list of candidates is empty (that is, no tuples are present) in step 715. If the list of candidates contains one or more tuples, a tuple is selected from the candidate list in step 720. No assumptions are being made with respect to the order of the tuples in the candidate list. Also, the tuple selection can happen in any order, since the candidate list is essentially an unordered set of tuples. Once a tuple is selected, the precedence constraint is read in step 725 and stored for further processing.

One or more embodiments of the present invention also determine if the tuple is empty (that is, no tasks are present) in step 730. If the tuple is not empty, a task is selected from the tuple. Here, the order in which the tasks are chosen matters because the first element of a tuple is the predecessor, while the latter task within the tuple is the successor. Once a task has been selected in step 740, the hostname is extracted in step 745 from the task by applying a simple read operation to the task suffix. Additionally, one or more embodiments of the present invention may determine if a sequence (for example, a container that stores tasks in a partial order) for the chosen host already exists in step 750. If a sequence for the host does not exist, a host sequence is created in step 755 and subsequently the currently selected task is inserted into the host sequence in step 760. If a sequence for the host does exist, a determination is made as to whether the task already exists in the host sequence in step 775. This is needed to prevent duplicate tasks in a host sequence. If the task is not already part of the host sequence, it is inserted into the host sequence in step 760. Otherwise, one or more embodiments of the present invention proceed to remove the task from the tuple in step 765.

The task is removed from the tuple in step 765 because it has already been processed. One or more embodiments of the present invention verify again if the tuple is empty in step 770 and proceed to insert the outgoing link reference into the task in step 780 if there is still a task in the tuple. A remaining task is, by definition, the successor task, as the predecessor has already been removed from the tuple in step 765 and placed into the host sequence. Consequently, step 780 inserts an outgoing link reference (that is, a pointer to a successor task, referring to the successor by its name) in the task of the host sequence. One or more embodiments of the present invention proceed then to step 740 and apply the task procedure (steps 740 through 765) to the remaining successor task, and remove this task from the tuple afterwards in step 765. This is advantageous because the successor task may refer to a different host for which a host sequence may either already exist or not.

Also, a check for task duplicates in step 740 may be carried out for the successor task as well. After the removal of the successor task, the tuple is then empty, and the check in step 770 yields a positive result. One or more embodiments of the present invention may proceed to step 785, where the precedence constraint that is embedded in the link reference of the incoming link reference of the successor task being contained in the host sequence (potentially from a previous iteration of the algorithm) is compared to the precedence constraint that is kept in memory for the current tuple instance. This is advantageous to ensure that the precedence constraint specified in the most recently inserted tuple is consistent with a precedence constraint between the same tasks that may have been inserted into the host sequence previously.

If it is determined in step 785 that the newly-inserted precedence constraint is different from the precedence constraint that is already stored, one or more embodiments of the present invention exit with an error condition in step 790 and subsequently end in step 799. This check is preferably carried out only once for the incoming link reference of the successor task, because its precedence constraint is, by definition, identical to the precedence constraint stored in the outgoing link of the predecessor task.

If the newly-inserted precedence constraint is identical to the precedence constraint that is already stored, one or more embodiments of the present invention proceed to step 795 and insert an incoming link reference into the successor task before continuing at step 735 with the removal of the already processed tuple from the candidate list. One or more embodiments of the present invention may additionally proceed to step 715 and determine if the techniques need to be repeated for one or more additional tuples contained in the candidate list. If, however, no more tuples remain for processing (that is, the list of candidates is empty), the completed change plan is stored in the change plan library in step 797, and the algorithm ends in step 799.

The following table depicts examples of the change plan generator application programming interfaces (APIs). The table includes base APIs that can generate, send and request receipt of partial orders of change management tasks for a given service and host name. Those skilled in the art will appreciate that the APIs can use one or more parameters (either shown, not shown, or in any combination thereof) to identify characteristics (as, for example, specified in the Functional Description column) used by the APIs.

Specifically, the constructChangePlanForInstall(parameters) API builds the change plan for the install change management operation based on a recursive "Drill-Down," carried out by the dependency service. The constructChangePlanForUpdate(parameters) API builds the change plan for the update change management operation by invoking a recursive "Drill-Up" on the dependency service. It retrieves all the dependents of a given component, that is, the components in the dependency hierarchy that are likely to be affected by an update change management operation. The constructChangePlanForUninstall(parameters) API builds the change plan for the uninstall change management operation. The constructChangePlanForRollback(parameters) API builds the change plan for the rollback change management operation, which is the opposite operation of update and restores the previously updated version of a component. The constructChangePlanForInitialConfigure(parameters) API builds the change plan for the initial-configure change management operation, which applies basic configuration settings to a component, which are needed to install it in the first place. The constructChangePlanForConfigure(parameters) API builds the change plan for the configure change management operation, which applies advanced configuration settings to a component so that it can be customized.

| APIs | Functional Description |
| --- | --- |
| constructChangePlanForInstall( ) | Change plan for the install change management operation is built. The activities in a workflow (process, flow, sequence) are created and populated with values from the dependency model |
| constructChangePlanForUpdate( ) | Change plan for the update change management operation is built. The activities in a workflow (process, flow, sequence) are created and populated with values from the dependency model |
| constructChangePlanForUninstall( ) | Change plan for the uninstall change management operation is built. The activities in a workflow (process, flow, sequence) are created and populated with values from the dependency model |
| constructChangePlanForRollback( ) | Change plan for the rollback change management operation is built. The activities in a workflow (process, flow, sequence) are created and populated with values from the dependency model |
| constructChangePlanForInitialConfigure( ) | Change plan for the initial-configure change management operation is built. The activities in a workflow (process, flow, sequence) are created and populated with values from the dependency model |
| constructChangePlanForConfigure( ) | Change plan for the configure change management operation is built. The activities in a workflow (process, flow, sequence) are created and populated with values from the dependency model |

Figure 9:
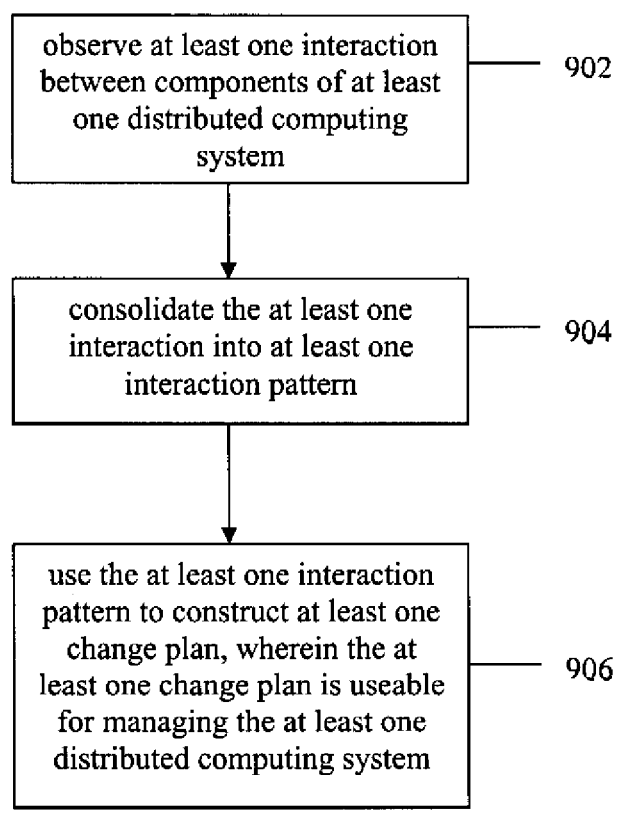
FIG. 9 is a flow diagram illustrating techniques for constructing at least one change plan, according to an embodiment of the present invention.

FIG. 9 is a flow diagram illustrating techniques for constructing at least one change plan, according to an embodiment of the present invention. Step 902 includes observing at least one interaction between two or more components of at least one distributed computing system. The step of observing at least one interaction may be, in one or more embodiments of the present invention, performed at run-time. Step 904 includes consolidating the at least one interaction into at least one interaction pattern. Step 906 includes using the at least one interaction pattern to construct at least one change plan, wherein the at least one change plan is useable for managing the at least one distributed computing system.

In one or more embodiments of the present invention, the step of constructing at least one change plan includes constructing at least one change plan in a machine-readable format by taking into account at least one change management operation and at least one change management pattern. The step of constructing at least one change plan may also include reverse-engineering a blueprint of at least one staging system at run-time. Also, the step of constructing at least one change plan may include identifying at least one algorithm, step and/or procedure applicable to changing a distributed computing system. For example, the at least one algorithm, step and/or procedure may be applicable in the constructing step, or in the removal and/or update functions, or in other operations included in the techniques.

In one or more embodiments of the present invention, the techniques may include facilitating an administrator to identify the at least one algorithm for the at least one distributed computing system as a whole or for selected parts of the distributed computing system. Also, one or more embodiments of the invention may include expressing at least one identified algorithm in a machine-readable format, such as a workflow and/or a computer program. The workflow and/or computer program may be persistently stored or subsequent reuse. Also, one or more embodiments of the present invention may include facilitating retrieval of the workflow and/or computer program to build a production system automatically. Building the production system may include loading the workflow and/or computer program into an automated deployment and provision system, and executing the workflow and/or computer program.

In one or more embodiments of the invention, techniques for constructing at least one change plan may further include the step of storing the at least one change plan for subsequent reuse and processing in a change plan library.

Economies of scale are accomplished because the knowledge gleaned from a smaller-scale staging system can be reused for the construction of a production system that is typically at least a magnitude larger than the staging system. In addition, persistently storing the constructed change plans in a change plan library allows their reuse whenever similar computing systems need to be built in the future.

Also, one or more embodiments of the present invention are applicable to cloning of systems.

Figure 10:
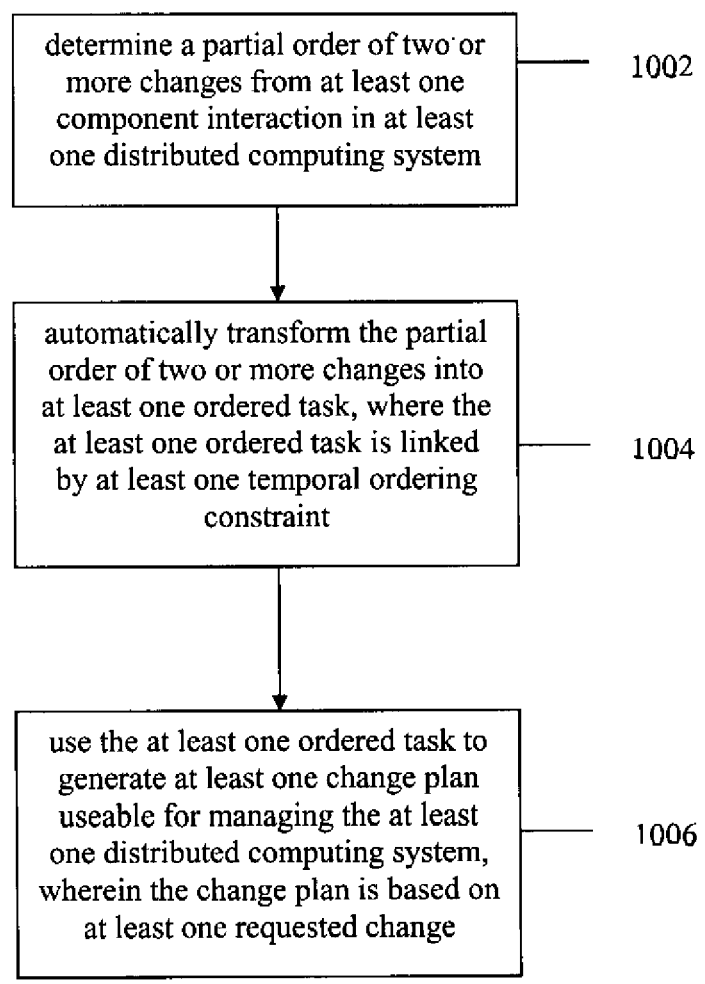
FIG. 10 is a flow diagram illustrating techniques for automatically determining at least one change plan from at least one component interaction, according to an embodiment of the present invention.

FIG. 10 is a flow diagram illustrating techniques for automatically determining at least one change plan from at least one component interaction, according to an embodiment of the present invention. Step 1002 includes determining a partial order of two or more changes from at least one component interaction in at least one distributed computing system. Step 1004 includes automatically transforming the partial order of two or more changes into at least one ordered task, wherein the at least one ordered task is linked by at least one temporal ordering constraint. Step 1006 includes using the at least one ordered task to generate at least one change plan useable for managing the at least one distributed computing system, wherein the at least one change plan is based on at least one requested change. The type of requested change may include, by way of example and not limitation, install, update, configure, uninstall, start and stop.

In one or more embodiments of the present invention, the techniques for automatically determining at least one change plan include a change plan generator, an interaction observer and an interaction pattern detector.

The step of generating at least one change plan may include computing allowable sequences of changes by observing one or more interactions between computing systems. Also, in one or more embodiments of the invention, generating at least one change plan includes minimizing total change time by exploiting parallelism between two or more components. The step of generating at least one change plan may also include an administrator accepting the at least one requested change and explicitly identifying the at least one computing system. In one or more embodiments of the present invention, the administrator identifies the computing system or systems to reverse-engineer by observing the transactions it handles.

A variety of techniques, utilizing dedicated hardware, general purpose processors, firmware, software, or a combination of the foregoing may be employed to implement one or more embodiments of the present invention. One or more embodiments of the invention can be implemented in the form of a computer product including a computer useable medium with computer useable program code for performing the method steps indicated. Furthermore, one or more embodiments of the invention can be implemented in the form of an apparatus including a memory and at least one processor that is coupled to the memory and operative to perform exemplary method steps.

Figure 11:
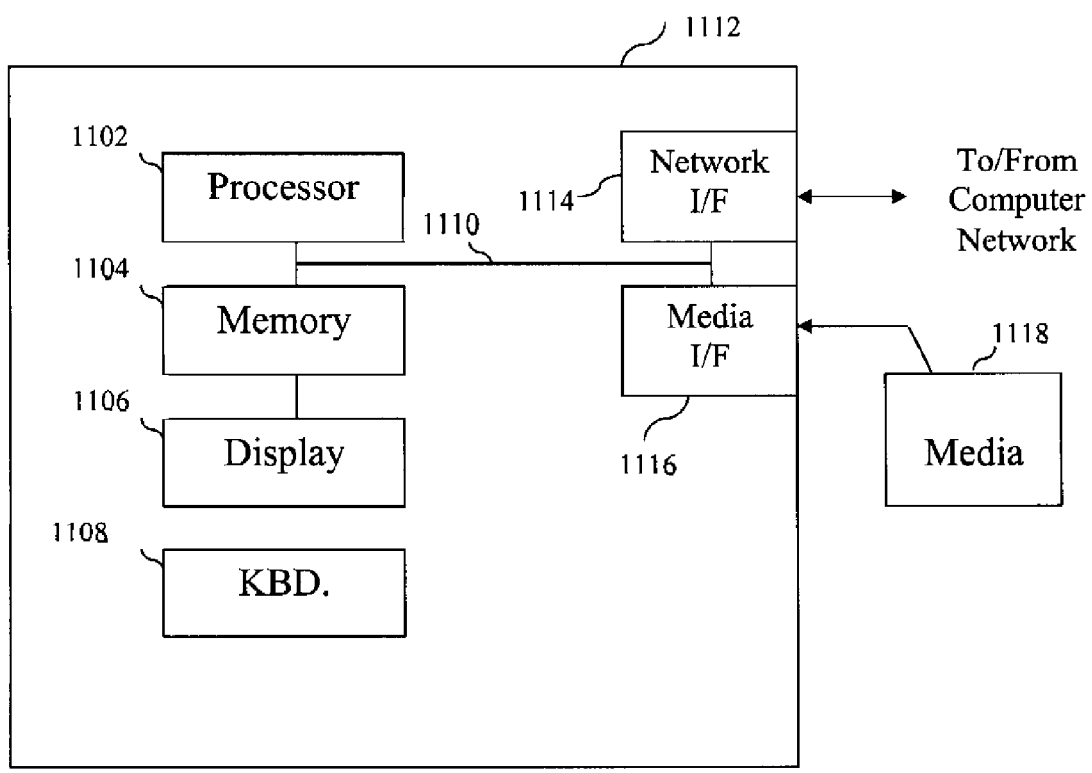
FIG. 11 is a system diagram of an exemplary computer system on which one or more embodiments of the present invention can be implemented.

One implementation of the present invention makes substantial use of software running on a general purpose computer or workstation. With reference to FIG. 11, such an implementation might employ, for example, a processor 1102, a memory 1104, and an input and/or output interface formed, for example, by a display 1106 and a keyboard 1108. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input and/or output interface" as used herein, is intended to include, for example, one or more mechanisms for inputting data to the processing unit (for example, mouse), and one or more mechanisms for providing results associated with the processing unit (for example, printer). The processor 1102, memory 1104, and input and/or output interface such as display 1106 and keyboard 1108 can be interconnected, for example, via bus 1110 as part of a data processing unit 1112. Suitable interconnections, for example via bus 1110, can also be provided to a network interface 1114, such as a network card, which can be provided to interface with a computer network, and to a media interface 1116, such as a diskette or CD-ROM drive, which can be provided to interface with media 1118.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and executed by a CPU. Such software could include, but is not limited to, firmware, resident software, microcode, and the like.

Furthermore, the invention can take the form of a computer program product accessible from a computer-useable or computer-readable medium (for example, media 1118) providing program code for use by or in connection with a computer or any instruction execution system. For the purposes of this description, a computer useable or computer readable medium can be any apparatus for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory (for example memory 1104), magnetic tape, a removable computer diskette (for example media 1118), a random access memory (RAM), a read-only memory (ROM), a rigid magnetic disk and an optical disk. Current examples of optical disks include compact disk-read only memory (CD-ROM), compact disk-read and/or write (CD-R/W) and DVD.

A data processing system suitable for storing and/or executing program code will include at least one processor 1102 coupled directly or indirectly to memory elements 1104 through a system bus 1110. The memory elements can include local memory employed during actual execution of the program code, bulk storage, and cache memories which provide temporary storage of at least some program code in order to reduce the number of times code is retrieved from bulk storage during execution.

Input and/or output or I/O devices (including but not limited to keyboards 1108, displays 1106, pointing devices, and the like) can be coupled to the system either directly (such as via bus 1110) or through intervening I/O controllers (omitted for clarity).

Network adapters such as network interface 1114 may also be coupled to the system to enable the data processing system to become coupled to other data processing systems or remote printers or storage devices through intervening private or public networks. Modems, cable modem and Ethernet cards are just a few of the currently available types of network adapters.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A computer-implemented method for automatically determining at least one change plan from at least one component interaction, the method comprising the steps of:

observing at least one interaction between two or more components of at least one distributed computing system in which invocation of at least a first component leads to invocation of at least a second component, wherein the at least one interaction is observed at least in part by tracking respective invocations of the two or more components;

determining a partial order of two or more changes from the at least one observed to component interaction in the at least one distributed computing system;

automatically transforming the partial order of two or more changes into at least one ordered task, wherein the at least one ordered task is linked by at least one temporal ordering constraint; and using the at least one ordered task to generate at least one change plan useable for managing the at least one distributed computing system, wherein the at least one change plan is based on at least one requested change;

wherein the steps are performed by a computer.

2. The method of claim 1, wherein the step of using the at least one ordered task to generate at least one change plan comprises minimizing total change time by exploiting parallelism between two or more components.

3. The method of claim 1, wherein the step of using the at least one ordered task to generate at least one change plan comprises an administrator accepting the at least one requested change and explicitly identifying the at least one computing system.

4. The method of claim 1, wherein the step of using the at least one ordered task to generate at least one change plan comprises computing at least one change plan by observing at least one interaction between two or more computing systems.

5. A computer program product comprising a non-transitory computer useable storage medium having computer useable program code for automatically determining at least one change plan from at least one component interaction, the computer program product including:
 computer useable program code for observing at least one interaction between two or more components of at least one distributed computing system in which invocation of at least a first component leads to invocation of at least a second component, wherein the at least one interaction is observed at least in part by tracking respective invocations of the two or more components;
 computer useable program code for determining a partial order of two or more changes from the at least one observed component interaction in at least one distributed computing system;
 computer useable program code for automatically transforming the partial order of two or more changes into at least one ordered task, wherein the at least one ordered task is linked by at least one temporal ordering constraint; and
 computer useable program code for using the at least one ordered task to generate at least one change plan useable for managing the at least one distributed computing system, wherein the at least one change plan is based on at least one requested change.

6. The computer program product of claim 5, wherein the computer useable program code for using the at least one ordered task to generate at least one change plan comprises minimizing total change time by exploiting parallelism between two or more components.

7. The computer program product of claim 5, wherein the computer useable program code for using the at least one ordered task to generate at least one change plan comprises an administrator accepting the at least one requested change and explicitly identifying the at least one computing system.

8. The computer program product of claim 5, wherein the computer useable program code for using the at least one ordered task to generate at least one change plan comprises computing at least one change plan by observing at least one interaction between two or more computing systems.

* * * * *